US 008510819B2

(12) United States Patent  (10) Patent No.: US 8,510,819 B2
Saunders et al.  (45) Date of Patent:  Aug. 13, 2013

(54) SYSTEM AND METHOD FOR MANAGING AND SECURING MOBILE DEVICES

(75) Inventors: Stuart James Saunders, Lakewood, OH (US); Kenneth Alan Adair, Burlington, KY (US)

(73) Assignee: Neevo, LLC, Cleveland, OH (US)

( * ) Notice: Subject to any disclaimer, the term of this patent is extended or adjusted under 35 U.S.C. 154(b) by 170 days.

(21) Appl. No.: 13/112,776

(22) Filed: May 20, 2011

(65) Prior Publication Data

US 2011/0306320 A1  Dec. 15, 2011

Related U.S. Application Data

(60) Provisional application No. 61/347,200, filed on May 21, 2010.

(51) Int. Cl.
 *H04L 29/06* (2006.01)
(52) U.S. Cl.
 USPC .............. 726/9; 726/6; 726/7; 726/8; 726/11; 713/168; 713/169; 713/170; 713/171; 713/172
(58) Field of Classification Search
 USPC ........................................................ 726/6, 9
 See application file for complete search history.

(56) References Cited

U.S. PATENT DOCUMENTS

| | | | |
|---|---|---|---|
| 7,181,252 B2 | 2/2007 | Komsi | |
| 7,184,750 B2 | 2/2007 | Tervo et al. | |
| 7,389,123 B2 | 6/2008 | Rydgren et al. | |
| 7,518,500 B2 | 4/2009 | Aninye et al. | |
| 7,590,937 B2 | 9/2009 | Jacobus et al. | |
| 7,603,435 B2 | 10/2009 | Welingkar et al. | |
| 2002/0026503 A1* | 2/2002 | Bendinelli et al. | 709/220 |
| 2003/0177389 A1* | 9/2003 | Albert et al. | 713/201 |
| 2008/0018459 A1 | 1/2008 | Derrick et al. | |
| 2008/0270791 A1* | 10/2008 | Nystrom et al. | 713/159 |
| 2009/0089887 A1 | 4/2009 | Aissi et al. | |
| 2009/0113543 A1 | 4/2009 | Adams et al. | |
| 2009/0253424 A1 | 10/2009 | Owen et al. | |
| 2009/0300715 A1 | 12/2009 | Ahn | |
| 2010/0107222 A1 | 4/2010 | Glasser | |
| 2010/0162368 A1 | 6/2010 | Aissi et al. | |
| 2010/0255825 A1* | 10/2010 | Bontempi et al. | 455/414.1 |

FOREIGN PATENT DOCUMENTS

| | | |
|---|---|---|
| EP | 1 473 952 A1 | 11/2004 |
| WO | WO-2004/098219 A1 | 11/2004 |

* cited by examiner

*Primary Examiner* — Longbit Chai
(74) *Attorney, Agent, or Firm* — Tarolli, Sundhein, Covell & Tummino LLP

(57) ABSTRACT

Systems and methods are provided for securing at least one mobile device. A server includes a controller and a non-transitory computer readable medium storing instructions executable by the controller. The executable instructions are configured to perform a method in which a secure communications session is established with a user and the user is allowed to input a list of a plurality of security actions to be performed at a mobile device associated with the user. A secure communications session is established with the mobile device, and the list of the plurality of security actions is provided to the mobile device simultaneously as a single instruction set.

20 Claims, 18 Drawing Sheets

TSIT Construction

TSIT = Time-sensitive Server Identity Token

Job Queue

| job_id | device_id | action | persistent | notification | state |
|--------|-----------|--------|------------|--------------|-----------|
| 543232 | 27119 | alert | true | feed | pending |
| 543233 | 27119 | track | true | feed | pending |
| 543234 | 9002 | backup | false | feed | received |
| 543235 | 27119 | lock | true | feed | pending |
| 543236 | 433 | wipe | true | feed, email | cancelled |
| ... | ... | ... | ... | ... | ... |

Triggers

| trigger_id | device_id | event | data | action | notification |
|---|---|---|---|---|---|
| 876001 | 21000 | zone_exited | zone=1 | track, lock | email, sms |
| 876002 | 21000 | zone_exited | zone=2 | lock | email |
| 876003 | 21000 | app_install | null | update | feed |
| 876004 | 21000 | app_install | null | scan | null |
| 876005 | 21000 | low_battery | level=10 | update | feed |
| 876006 | 21000 | time_elapse | mins=30 | locate, update | feed |
| 876007 | 21000 | boot | null | update | feed |
| ... | ... | ... | ... | ... | ... |

Fig. 14

SYSTEM AND METHOD FOR MANAGING AND SECURING MOBILE DEVICES

RELATED APPLICATION

This application claims priority from U.S. Provisional Application No. 61/347,200, filed May 21, 2010, the subject matter of which are incorporated herein by reference in their entirety.

BACKGROUND

The use of mobile electronic devices continues to expand as the sophistication of hardware technology and software applications evolves. Along with this, the value of mobile devices is also increasing, in terms of both the cost of some mobile devices, their service capabilities, and the information they contain or communicate. Mobile devices are particularly susceptible to physical and information loss. As a consequence, there is an ever-growing need for mobile device protection.

SUMMARY

In accordance with an aspect of the present invention, a method is provided for securing a mobile device. A time-sensitive server identity token (TSIT), having an associated time stamp, is generated at a server. The TSIT is sent to the mobile device and verified at the mobile device. Authentication information from the mobile device to the server in response to verification of the TSIT at the mobile device. A secure communications session is established between the mobile device and the server. Status information is provided from the mobile device to the server, and a list of at least one security action is provided from the server to the mobile device. The list of at least one security action is processed at the mobile device such that each of the at least one security action is either provided to a local queue for storage or provided to a client software of the mobile device for execution In accordance with another aspect of the present invention, a system is provided for securing at least one mobile device. A server includes a controller and a non-transitory computer readable medium storing instructions executable by the controller. The executable instructions are configured to perform a method in which a secure communications session is established with a user and the user is allowed to input a list of a plurality of security actions to be performed at a mobile device associated with the user. A secure communications session is established with the mobile device, and the list of the plurality of security actions is provided to the mobile device simultaneously as a single instruction set.

In accordance with yet another aspect of the present invention, a system is provided for securing at least one mobile device. A mobile device includes a controller and a non-transitory computer readable medium storing instructions executable by the controller. The executable instructions are configured to perform a method in which authentication information and status information are provided to an associated server. The status information comprising a trigger update representing a local queue of active triggers. An update is retrieved from the server representing a difference between the local queue and a job queue at the server. The local queue is modified according to the received update.

DRAWINGS

These and other features, aspects, and advantages of the present invention will become better understood with regard to the accompanying drawings, following description, and appended claims.

FIG. 10 illustrates an exemplary job queue;

FIG. 14 illustrates an exemplary trigger datastore;

DESCRIPTION

Figure 1:
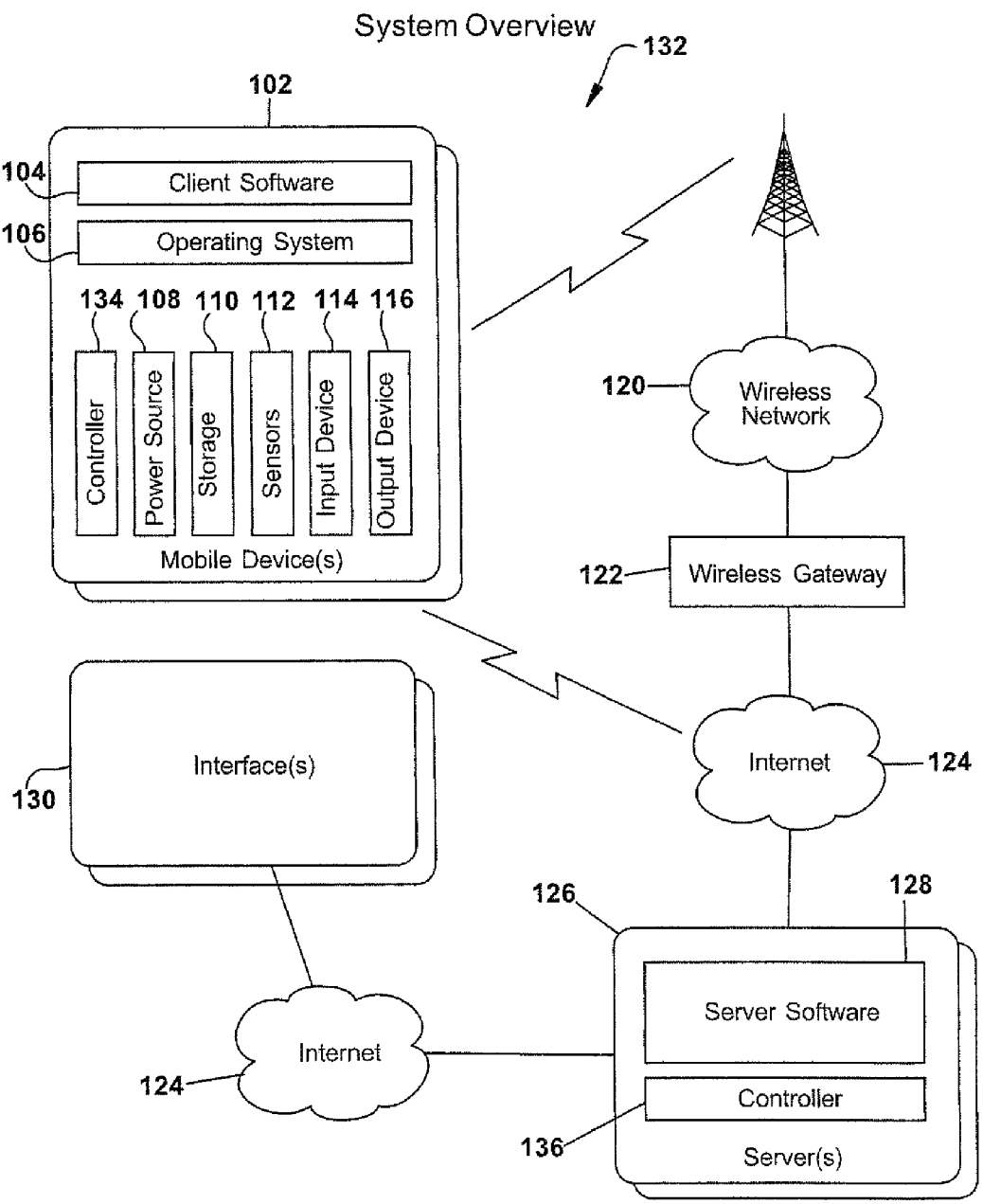
FIG. 1 shows a block diagram system overview of an embodiment of a security system.

Mobile device security may focus on protecting, among other things, the mobile device itself, the service capabilities of the mobile device, the communications of the mobile device, and the information residing on the mobile device. In many cases, when confronted with a potential loss, it is advantageous for the user to be able to initiate security activities remotely, for example, after the mobile device has been lost or stolen. Various techniques or processes exist for remotely locating the mobile device, disabling the capabilities of the mobile device, and for backing-up the information on the mobile device.

Regardless of which technique is utilized for executing these tasks, the security and effectiveness of a remote process may be lacking. In particular, remote communications to a mobile device may be susceptible to being intercepted, lost (unexecuted), or executed ineffectively.

For example, communications to and from the mobile device may not be sufficiently secure, resulting in intercepted or bogus communications, which may be malicious. Unauthorized commands sent to a mobile device can result in a variety of problems for the user, such as, for example, loss of information, loss of device functionality, theft of services, user identification theft, etc.

A common approach to sending commands to a mobile device requires the mobile device to be "ON" and able to receive the command at the time that the command is sent, or pushed, to the mobile device. If the mobile device is not available to receive the pushed command, the command will not be executed, resulting in less than desirable protection of the mobile device.

In addition, common approaches to executing remote commands do not provide feedback regarding the status of the commands sent to the mobile device. In this case, the user is unaware of the success or failure of the intended process and the current state of mobile device protection.

The following paragraphs include definitions of exemplary terms used within this disclosure. Except where noted otherwise, variants of all terms, including singular forms, plural forms, and other forms, fall within each exemplary term meaning. Except where noted otherwise, capitalized and non-capitalized forms of all terms fall within each meaning.

"Circuit," as used herein includes, but is not limited to, hardware, firmware, software or combinations of each to perform a function(s) or an action(s). For example, based on a desired feature or need, a circuit may include a software controlled microprocessor, discrete logic such as an application specific integrated circuit (ASIC), or another programmed logic device. Additionally, a circuit may include a sensor, detector, or emitter/detector combination.

"Comprising," "containing," "having," and "including," as used herein, except where noted otherwise, are synonymous and open-ended. In other words, usage of any of these terms (or variants thereof) does not exclude one or more additional elements or method steps from being added in combination with one or more delineated elements or method steps.

"Computer communication," as used herein includes, but is not limited to, a communication between two or more computer components and can be, for example, a network transfer, a file transfer, an applet transfer, an e-mail, a hyper-text transfer protocol (HTTP) message, a datagram, an object transfer, a binary large object (BLOB) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), point-to-point system, a circuit switching system, a packet switching system, any other current or subsequent communication system, and so on.

"Computer component," as used herein includes, but is not limited to, a computer-related entity, either hardware, firmware, software, a combination thereof, or software in execution. For example, a computer component can be, but is not limited to being, a processor, an object, an executable, a process running on a processor, a thread of execution, a program and a computer. By way of illustration, both an application running on a server and the server can be computer components. One or more computer components can reside within a process or thread of execution and a computer component can be localized on one computer or distributed between two or more computers.

"Controller," as used herein includes, but is not limited to, any circuit or device that coordinates and controls the operation of one or more input, output, or other types of devices. For example, a controller can include a device having one or more processors, microprocessors, or central processing units (CPUs) capable of being programmed to perform input or output functions.

"Logic," as used herein includes, but is not limited to, hardware, firmware, software or combinations of each to perform a function(s) or an action(s), or to cause a function or action from another component. For example, based on a desired application or need, logic may include a software controlled microprocessor, discrete logic such as an application specific integrated circuit (ASIC), or other programmed logic device. Logic may also be fully embodied as software.

"Operable connection" (or a connection by which entities are "operably connected"), as used herein includes, but is not limited to, a connection in which signals, physical communication flow, or logical communication flow may be sent or received. Usually, an operable connection includes a physical interface, an electrical interface, a wireless interface, or a data interface, but an operable connection may include differing combinations of these or other types of connections sufficient to allow operable communication or control.

"Operative communication," as used herein includes, but is not limited to, a communicative relationship between devices, logic, or circuits, including wired and wireless relationships. Direct and indirect electrical, electromagnetic, and optical connections are examples of connections that facilitate operative communications. Two devices are in operative communication if an action from one causes an effect in the other, regardless of whether the action is modified by some other device. For example, two devices in operable communication may be separated by one or more of the following: i) amplifiers, ii) filters, iii) transformers, iv) optical isolators, v) digital or analog buffers, vi) analog integrators, vii) other electronic circuitry, viii) fiber optic transceivers, ix) Bluetooth communications links, x) IEEE 802.11 communications links, xi) satellite communication links, xii) gateways, repeaters, routers, and hubs, xiii) wired or wireless networks, xiv) mobile communications towers, and xv) other wired or wireless communication links. Operative communication may be facilitated by and exist between devices using, for example, the internet or service provider networks. As another example, an electromagnetic sensor is in operative communication with a signal if it receives electromagnetic radiation from the signal. As a final example, two devices not directly connected to each other, but both capable of interfacing with a third device, e.g., a central processing unit (CPU), are in operative communication.

"Or," as used herein, except where noted otherwise, is inclusive, rather than exclusive. In other words, "or" is used to describe a list of alternative things in which one may choose one option or any combination of alternative options. For example, "A or B" means "A or B or both" and "A, B, or C" means "A, B, or C, in any combination or permutation." If "or" is used to indicate an exclusive choice of alternatives or if there is any limitation on combinations of alternatives, the list of alternatives specifically indicates that choices are exclusive or that certain combinations are not included. For example, "A or B, but not both" is used to indicate use of an exclusive "or" condition. Similarly, "A, B, or C, but no combinations" and "A, B, or C, but not the combination of A, B, and C" are examples where certain combinations of alternatives are not included in the choices associated with the list.

"Processor," as used herein includes, but is not limited to, one or more of virtually any number of processor systems or stand-alone processors, such as microprocessors, microcontrollers, central processing units (CPUs), distributed processors, paired processors, and digital signal processors (DSPs), in any combination. The processor may be associated with various other circuits that support operation of the processor, such as random access memory (RAM), read-only memory (ROM), programmable read-only memory (PROM), erasable programmable read-only memory (EPROM), clocks, decoders, memory controllers, or interrupt controllers, etc. These support circuits may be internal or external to the processor or its associated electronic packaging. The support circuits are in operative communication with the processor. The support circuits are not necessarily shown separate from the processor in block diagrams or other drawings.

"Software," as used herein includes, but is not limited to, one or more computer readable or executable instructions that cause a computer or another electronic device to perform functions, actions, or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, instructions stored in a memory, part of an operating system, or other types of executable instructions. It will be appreciated by one of ordinary skill in the art that the form of software is dependent on, for example, requirements of a desired application, the environment it runs on, or the desires of a designer/programmer or the like. Software may be embodied as an "application."

"Software component," as used herein includes, but is not limited to, a collection of one or more computer readable or executable instructions that cause a computer or other electronic device to perform functions, actions or behave in a desired manner. The instructions may be embodied in various forms like routines, algorithms, modules, methods, threads, or programs. Software components may be implemented in a variety of executable or loadable forms including, but not limited to, a stand-alone program, a servelet, an applet, instructions stored in a memory, and the like. Software components can be embodied in a single computer component or can be distributed between computer components.

A "security action", as used herein, is an action taken to enhance the security of a mobile device and can include a notification from the remote device to a current user or a remote party or a change in the status of the mobile device, which can be apparent to or hidden from a current user. A "job" is a security action that is executed at the mobile device immediately upon its receipt from the server. A "trigger" is a security action paired with a condition, the logical truth or falsity of which is determinable at the mobile device. Triggers can persist at the mobile device, and do not necessarily expire once invoked.

The following table includes long form definitions of exemplary acronyms, abbreviations, and labels for variables and constants in mathematical or logical expressions used within this disclosure. Except where noted otherwise, variants of all acronyms, including singular forms, plural forms, and other affixed forms, fall within each exemplary acronym meaning. Except where noted otherwise, capitalized and non-capitalized forms of all acronyms fall within each meaning.

| Acronym | Long Form |
| --- | --- |
| API | Application Programming Interface |
| GPS | Global Positioning System |
| RFID | Radio-Frequency IDentification |
| RSS | Really Simple Syndication |
| SD | Secure Digital |
| SHA-1 | Secure Hash Algorithm, standard 1 |
| SHA-2 | Secure Hash Algorithm, standard 2 |
| SIM | Subscriber Identity Module |
| SSL | Secure Socket Layer |
| SMS | Short Message Service |
| Wi-Fi | Trademark of the Wi-Fi Alliance; a.k.a. Wireless Fidelity |

Reference is first made to FIG. 1, which shows a block diagram of an embodiment of a security system 132. The system 132 includes a server 126 or cluster of servers 126 running a centrally managed server software application 128 or security engine responsible for orchestrating the security system 132. The server 126 may be embodied as a computer, for example, and may include one or more processors or controllers 136 and other computer components (not shown). The server may also include various software programs or components in addition to the server software 128. A cluster of servers 126 may communicate with each other and with other devices of the system 132 using, for example, computer communications.

The system 132 also includes one or more mobile devices 102. Examples of mobile devices 102 that can communicate with a network, include, but are not limited to, for example, mobile phones, smart phones, laptop computers, personal media players, personal entertainment systems, and various other portable electronics. Mobile devices 102 may also include devices not intended to be used in a portable manner, but still capable of communicating with a network, such as, for example, televisions, DVD players, cameras, car electronics, and various other electronics or appliances.

A mobile device 102 is comprised of an operating system 106 which manages storage facilities 110 (e.g., hard disk, SD card, SIM card, etc.), input devices or components 114 (e.g., buttons, keyboard, touch-screen, microphone, etc.), output devices or components 116 (e.g., display, speakers, etc.), sensors 112 (e.g., accelerometer, GPS, etc.) and a power source 108 (e.g., battery). The mobile device 102 may also include one or more processors or controllers 134.

The mobile device 102 may also include various software programs or components, including the client software 104. The client software 104 is developed to interface with the server application 128 to support the communications and activities of the security system 132. The client software 104 may be a thin-client application, designed to minimize its own use of mobile device 102 resources. For example, the client software 104 may execute various functions or tasks of the system 132 by utilizing the capabilities of other software applications that, for example, may reside on the mobile device 102. In this manner, storage 110 space and processing power dedicated to the functions of the system 132 on the mobile device 102 may be minimized. The client software 104 may also reside in a dormant state until needed or triggered, further minimizing the need for or use of mobile device 102 resources.

The mobile device 102 may be in operative communication with the system 132 and, in particular, the server 126, via, for example, the internet 124 or through a service provider network of the mobile device 102. The service provider network, may include various communication devices, such as, for example, and in various combinations, transmission towers, a wireless network 120, and a wireless gateway 122.

The system 132 may also include numerous interface 130 possibilities (e.g., web application, RSS, secure API, etc.) with the centrally managed server application 128. The interface 130 may be in operative communication with the system 132 and, in particular, the server 126, via, for example, the internet 124.

The operative communication between the mobile device 102 and the server 126, and in particular, between the client software 104 and the server software 128, should utilize a robust, secure communication link. In particular, for example, the system 132 utilizes an operable connection between these devices that protects the communications and the information therein.

Figure 2:
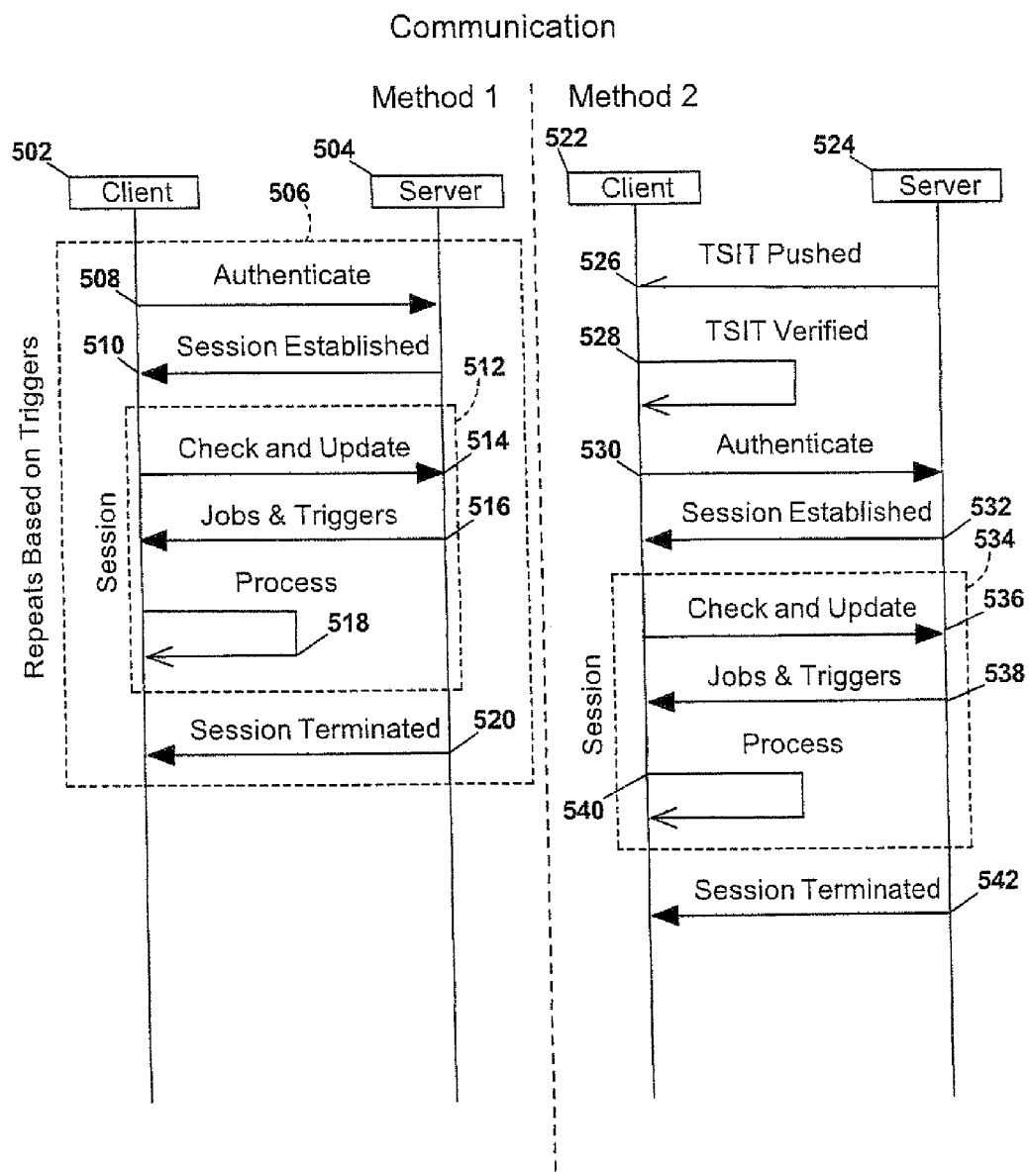
FIG. 2 illustrates sequence diagrams showing two embodiments for creating a secure communication tunnel.

FIG. 2 illustrates sequence diagrams showing two embodiments for creating a secure communication tunnel between the client 104 of the mobile device 102 and the server software application 128 of the server 126. The communication tunnel facilitates secure, effective, and operative communication between these devices.

In the first embodiment, shown as Method 1 in FIG. 2, triggers are used to wake the dormant mobile client 502 and, for example, manage repetition of the process sequence shown in the dashed box 506. The process begins at step 508 when a trigger fires, prompting the mobile client 502 to attempt to authenticate the client, which, for example, may include sending a private API key to the server application 504. An API key is created during installation/activation and it is used for authentication and access control. Exemplary triggers, for example, may include a time elapse since a last contact with the server 126, a specific time for a periodic event (e.g., as a condition for a periodic status update to the server every twenty-four hours), device 102 boot, detection of a location outside of a predetermined region, detection of low battery life, or any other specific event. It will be appreciated that triggers can be generated at the mobile device 102, for example, by the user, as well as provided to the mobile device by the server 126.

Upon successful authentication at step 508, the server application 504 can establish a secure session at step 510 with the mobile client 502. Generally, authentications, such as for a user or a device, are carried out by the server 504 and in the event of a failure, the process will end before the secure session is established. This session 512 may continue and stay alive, for example, via polling or a persistent socket (e.g., PubSub). In the event this session 512 is prematurely terminated (e.g., data connection lost, process killed) the mobile client 502 may attempt to re-establish the session 512. After the session 512 is established, the mobile client 502 can notify the server application 504 of events that have occurred on the mobile device 102 since the last session during the check and update step 514. For example, if the mobile device 102 executed jobs or triggers outside of a session 512, these events can be logged and may be transferred in step 514 to the server application 504 upon a subsequent secure session in step 512. In one implementation, these logged events can include a trigger update representing a local queue of active (e.g., non-expired) triggers stored at the device.

Still referring to Method 1 of FIG. 2, while the session 512 is alive, after the mobile client 502 relays events (e.g., jobs executed, triggers fired) in step 514, the mobile client 502 can receive jobs and triggers during step 516, which may be, for example, in near real-time. In one example, this can include receiving an update from the server representing a difference between the local queue and a job queue at the server. Next, in step 518, jobs may be processed in the order received and triggers are acted upon accordingly. This can include modifying the local queue according to the received update, as to add, remove, or modify one or more triggers. Once complete, the process may repeat until the session 512 times out or, for example, the server application 504 terminates the session 512 at step 520 or the client application 502 terminates the session 512.

Figure 5:
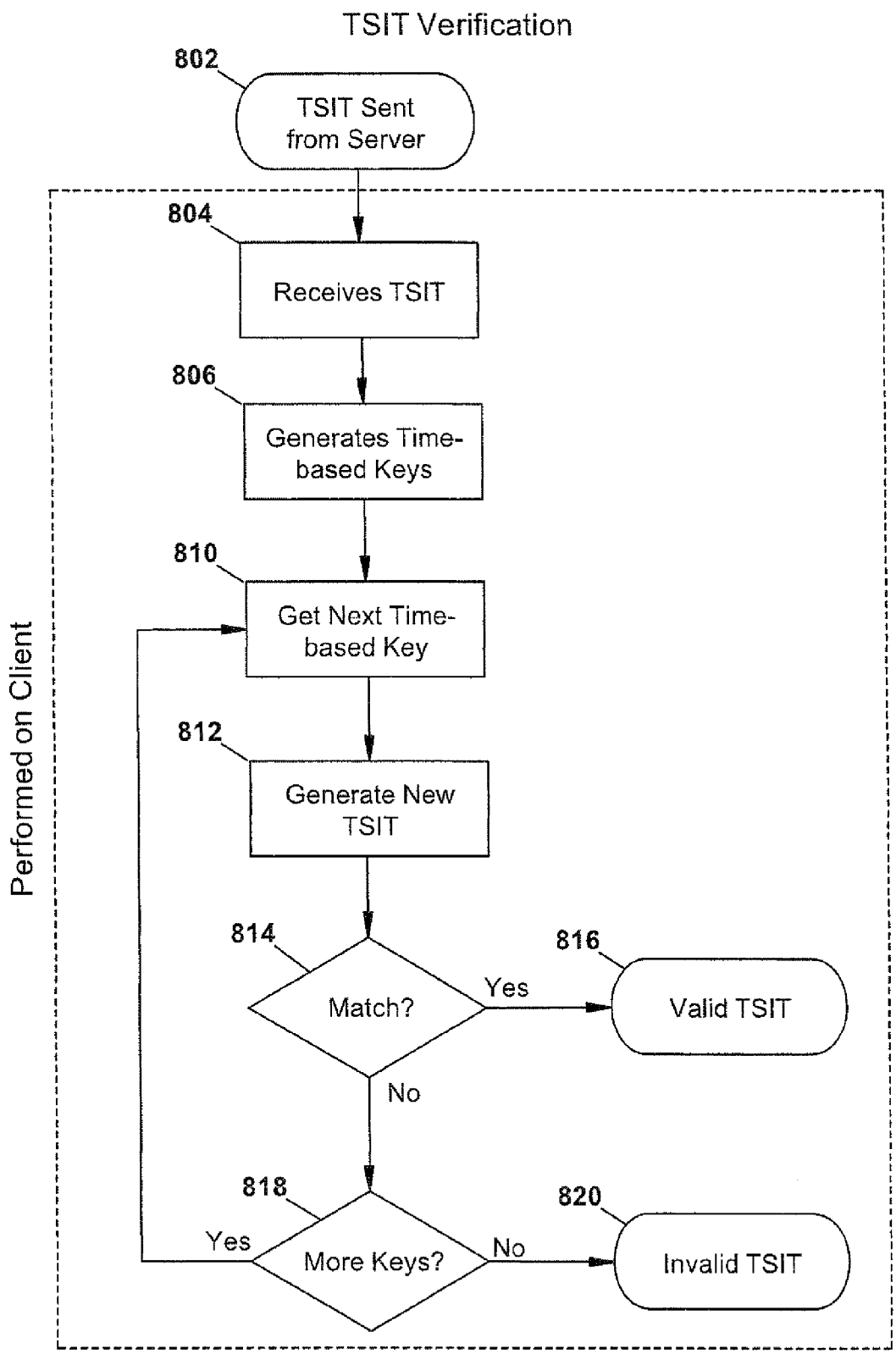
FIG. 5 is a flow chart of an exemplary process for verifying a time-sensitive server identity token.

In the second embodiment, shown as Method 2 in FIG. 5, a time-sensitive server identity token (TSIT) may be used to wake the dormant mobile client 522 at step 526. A TSIT may be useful to start a secure connection on-demand rather than wait for the mobile client 522 to initiate the session as in Method 1 FIG. 2. The server application 524 may begin this process by pushing the TSIT to the mobile client 522 during step 526. Next, the mobile client 522 can verify the TSIT at step 528. TSIT verification is discussed in detail below and shown in FIG. 5. Next, in step 530, the mobile client 522 can send a private API key 530 to the server application 524 to authenticate the client. It will be appreciated that the private API key 530 can be made persistent (e.g., stored in a location unaffected by a wipe of the mobile device 102), such that the private API key will survive a wipe of the device. In this implementation, when it is detected at the mobile device 102 that data associated with the mobile client 522 is absent or incomplete, the private API key 530 can be used to authenticate the mobile device with the server 126, and the client data can be synchronized with stored client data on the server.

Upon successful authentication at step 530, the server application 524 can establish a secure session at step 532 with the mobile client 522. This session 534 may continue and stay alive, for example, via polling or a persistent socket (e.g., PubSub). In the event this session 534 is prematurely terminated (e.g., data connection lost, process killed) the mobile client 522 can attempt to re-establish the session 534. After the session 534 is established, the mobile client 522 can notify the server application 524 of events that have occurred on the mobile device 102 since the last session during the check and update step 536. For example, if the mobile device executed jobs or triggers outside of a session 534, these events would be logged and may be transferred 536 to the server application 524 upon a subsequent secure session in step 510.

Still referring to Method 2 of FIG. 5, while the session 534 is alive, after the mobile client 522 relays events (e.g., jobs executed, triggers fired) in step 536, the mobile client 522 can receive jobs and triggers during step 538, which may be, for example, in near real-time. Next, in step 540, jobs may be processed in the order received and triggers are acted upon accordingly. Once complete, the process may repeat until the session 534 times out or, for example, the server application 524 terminates the session 534 at step 542 or the client application 522 terminates the session 534.

Figure 3:
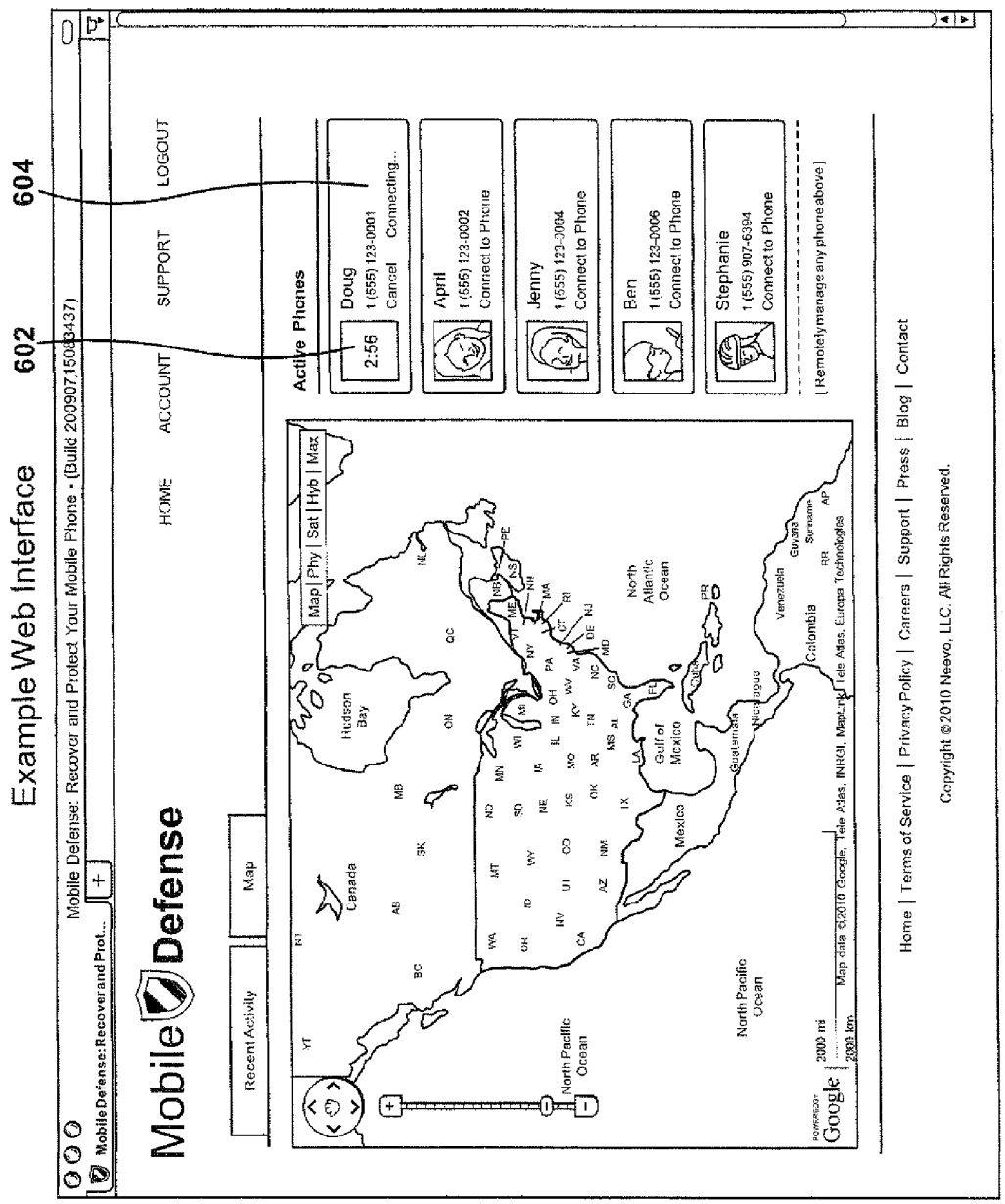
FIG. 3 is an exemplary screen shot of a web interface illustrating Method 2 of FIG. 2 for creating a secure communication tunnel.

FIG. 3 is an exemplary screen shot of a web interface illustrating Method 2 of FIG. 2. In this screen shot, visual feedback 604 may be provided to a user to denote a pending remote session attempt. Additionally, a timeout countdown 602 may be displayed once the TSIT is sent.

Figure 4:
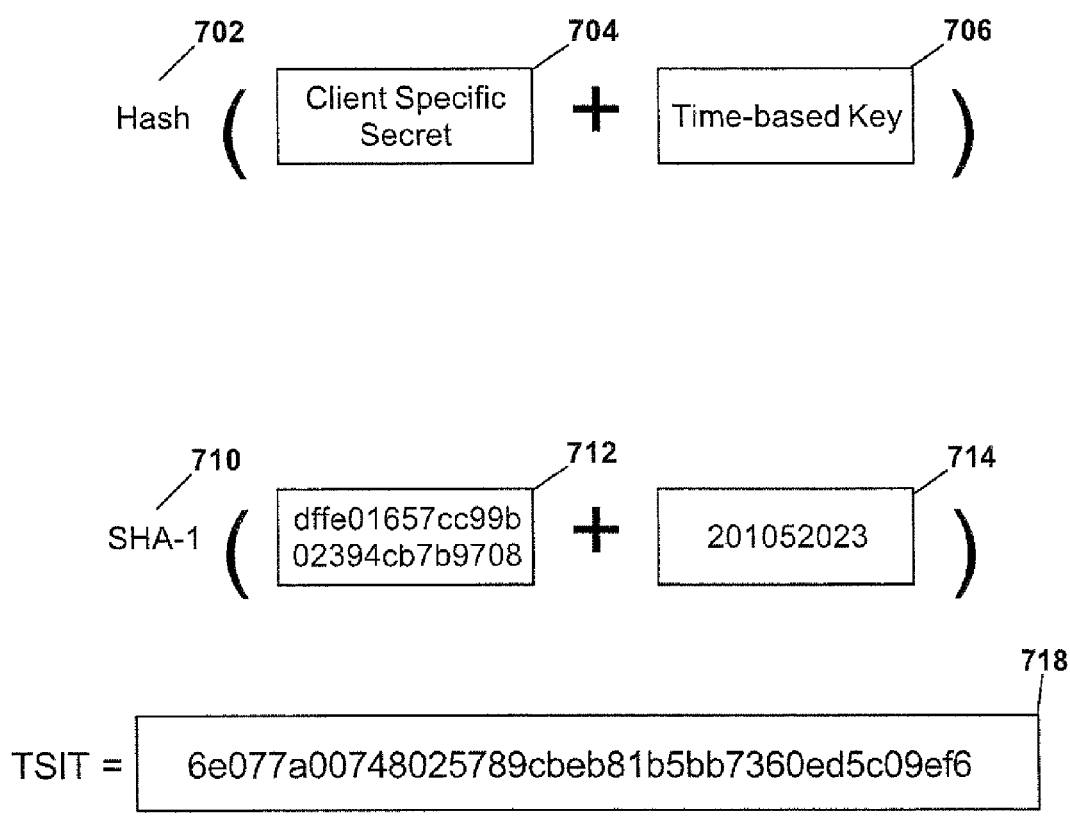
FIG. 4 illustrates exemplary embodiments for creating a time-sensitive server identity token.

FIG. 4 illustrates exemplary embodiments for creating a TSIT. The first exemplary embodiment is a TSIT algorithm intended for one-way encryption. The time sensitive one-way encryption when utilized in conjunction with SSL may be useful to prevent forged requests and man-in-the-middle attacks. The hash function 702 can be any suitable cryptographic algorithm (e.g., SHA-2), but the mobile client 522 and server application 524 must be in agreement. The message being hashed may include a randomly generated client specific secret 704 (i.e., salt) and a time-based key 706 using, for example, Coordinated Universal Time (UTC). The time-based key 706 is preferably rounded off to account for discrepancies between token generation on the server 126 and the time received on the mobile device 102. In a preferred embodiment, the mobile client 522 and server application 524 agree upon any rounding precision prior to constructing the TSIT.

Still referring to FIG. 4, a second exemplary embodiment for creating a TSIT is shown. This embodiment can utilize a SHA-1 cryptographic hash function 710 and appropriate variables 712, 714 for the TSIT algorithm. In this example, the resulting TSIT (i.e., digest) is shown in box 718. This embodiment may be useful when, for example, the user wants to create a secure connection on-demand rather than wait for the mobile client 522 to initiate the session as in Method 1 FIG. 2.

FIG. 5 is a flow chart of an exemplary process for verifying a time-sensitive server identity token (TSIT) on a mobile device 102. The process may begin at block 802 when the TSIT is pushed over an operable connection from the server application 128 to the mobile device 102. Once the TSIT is received at block 804 by the mobile device 102 the mobile client 104 will generate a collection of possible time-based keys at block 806 to account for the discrepancy between when the TSIT was created by the server application 128 and when it was received by the mobile client 104. For example, using the time-based key from FIG. 4, block 706, 201052023 and an offset of one hour, the mobile client 104 would generate the following collection of time-based keys: 201052022, 201052023, 201052024. Once the keys have been generated the mobile client 104 will loop through block 818 each time-based key 706 in the collection, using each individual time-based 706 key plus the client-specific secret 705 to generate a new TSIT at block 812. As each TSIT is generated it will be compared at block 814 to the TSIT received by the server application 128. If one of the TSIT generated by the mobile client 104 matches the TSIT from the server application 128 it is considered a valid TSIT at block 816; otherwise, it is considered to be invalid at block 820.

Once a secure connection is established between the mobile device 102 and the server 126, the server software 128 can exchange information, such as, for example, commands or tasks (in the form of jobs) and status information with the client software 104. This exchange of information may be used to manage and protect the mobile device 102. Exemplary jobs that may be directed to the mobile device 102 include commands that can, for example, alert the user to the location of the mobile device 102, silence the mobile device 102, locate the mobile device 102, track the mobile device 102, lock or unlock the mobile device 102, backup information on the mobile device 102, wipe information from the mobile device 102, etc. As mentioned above the thin-client software 104 may utilize, for example, the native capabilities of software applications that, for example, may reside on the mobile device 102 but are not part of the client software 104. In addition, the client software 104 can provide status information to the server software 128, such as, for example, battery status, device settings, installed applications, changes to the memory of the device, and performance information of the mobile device 102 and the status of jobs directed to the mobile device 102.

Given the inherent nature of mobile devices 102 and mobile networks, pushing jobs, such as commands or tasks, directly to a mobile device 102 via delivery mechanisms such as, for example, SMS, may be extremely unreliable. For instance, if a user or system issues a job via SMS, it may not be delivered in a timely manner or at all. Mobile devices 102 and mobile networks may both be volatile systems. In particular, mobile devices 102 routinely lose power and experience connectivity fluctuations. Pushing commands directly to the device 102 may also limit the ability to cancel or update unprocessed jobs. In addition, this type of job issuance may have inherent and serious security risks. The algorithm used to generate commands for a device 102 may be easily reverse engineered, which would enable malicious attacks from unauthorized users or systems (e.g., wiping or bricking devices, etc.).

Figure 6:
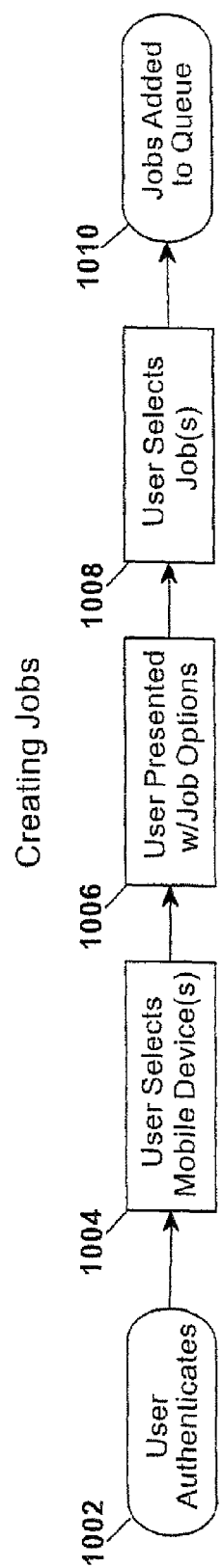
FIG. 6 is a flow chart of an exemplary job creation process.
Figure 7:
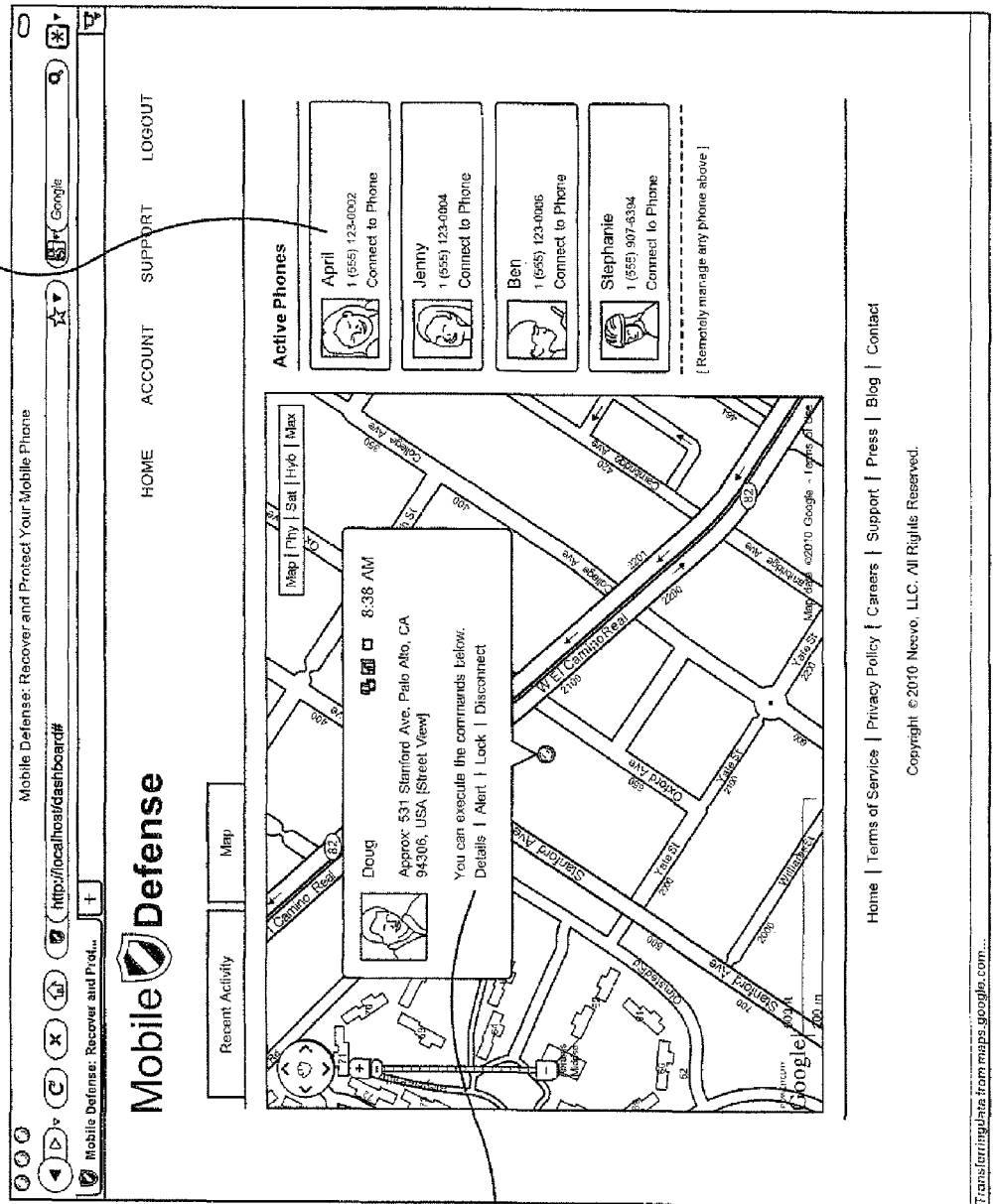
FIG. 7 is a sample screen shot of a user interface during the job creation process.

FIGS. 6 and 7 illustrate a method of creating and issuing jobs according to an embodiment of the present invention. FIG. 6 is a flow chart of an exemplary job creation process. FIG. 7 is a sample screen shot from an exemplary user interface 130 during the job creation process. The process starts with block 1002, where a user can be authenticated by the system. Generally, access to the server application 128 is controlled by authentication over an encrypted operable connection. In the event authentication fails, the user will not be granted access to the server application 128 and the appropriate response will be issued. After a user has been authenticated in block 1002, they can select a mobile device(s) 102 in block 1004. For example, a list of available devices 1104 is shown in FIG. 7. Once selected, the logical flow proceeds to block 1006, where the user or system can be provided with available job options. For example, a list of available job options 1102 is shown in FIG. 7. The user may select a job in block 1008. After the user has selected one or more jobs in block 1008, the logical flow proceeds to block 1010, where newly created jobs can be added to the queue.

Figure 8:
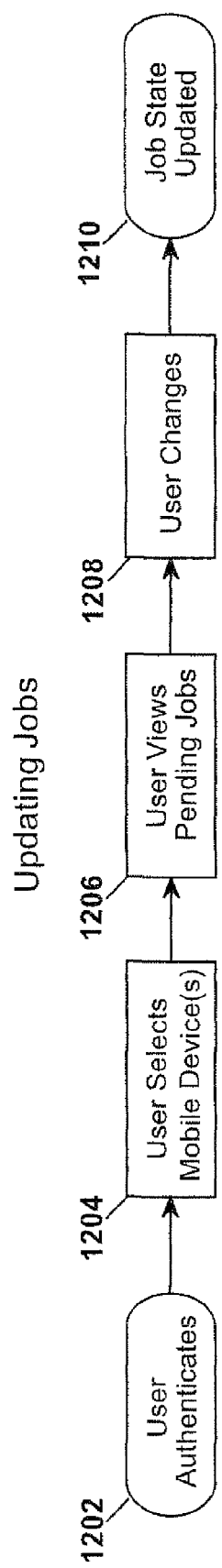
FIG. 8 is a flow chart of an exemplary job update process.

FIG. 8 is a flow chart of an exemplary job update process, which describes how a user or system can modify an existing job in the queue. The process starts with block 1202, where a user can be authenticated by the system. After a user has been authenticated with the system in block 1202, they can select a mobile device(s) 102 in block 1204. Once a mobile device 102 is selected in block 1204, the user can view the respective pending jobs for that mobile device 102 in block 1206. Next, the logical flow continues to block 1208, where the user can change jobs under certain circumstances (e.g., cancelling an unprocessed job). Once changed, jobs can be updated in the queue in block 1210.

Figure 9:
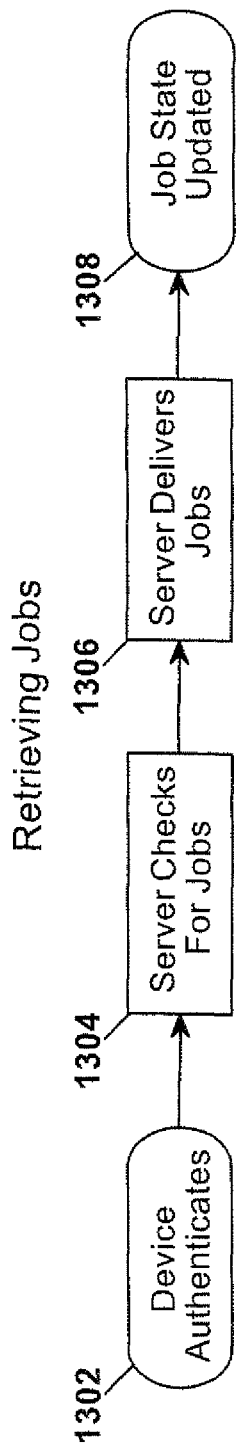
FIG. 9 is a flow chart of an exemplary job retrieval process.

FIG. 9 is a flow chart of an exemplary job retrieval process, which depicts how jobs can be retrieved from the job queue. The process starts with block 1302, where a device 102 can be authenticated by the system. After a device 102 has been authenticated in block 1302, the logical flow proceeds to block 1304, where the server 126 can determine if there are any relevant jobs for the device 102 in the job queue. If the system determines that there are jobs, the logical flow proceeds to block 1306, where the jobs are delivered to the device 102. Next, in block 1308, the job can be updated with the appropriate state.

To illustrate this process for several mobile devices, FIG. 14 illustrates an exemplary job queue. This simplified job queue contains a series of sequential exemplary jobs (or tasks), identified as job_id 1404, for specific exemplary devices 1406, which are identified with a device_id 1406. The action to be performed by a particular job 1404 is shown as 1408. An exemplary persistent flag 1410 is also shown. Some jobs may only be valid for a certain period of time while others remain persistent, not expiring until executed or modified. Optionally jobs can result in various types of notifications 1412 being sent to a user or system. A state field 1414 is also displayed to indicate the state or status of the job 1404. These jobs 1404 may be executed based on their order in the queue, state 1414, some other type of priority, or any combination thereof. The jobs 1404 in the queue may be grouped in sets, assigned in batch, ranked by priority, have dependencies, and optionally include the notification(s) 1412. For example, job #543235, shown as 1402, can lock device #27119 after jobs #543232 and #543233 have been processed, based on the order of the jobs 1404. As mentioned above, jobs 1404 in the queue are usually and may be preferably stateful. For example, a job 1404 may be in a pending, processed, or cancelled state 1414.

In this manner, via an exemplary user interface 130, the server software application 128 allows a user to select jobs 1404 to be performed by a mobile device 102 by adding jobs 1404 to the job queue (as shown in FIG. 6). The job queue resides on the server 126 and the jobs 1404 in the job queue are not pushed to the mobile device 102. Rather, the mobile device 102 periodically checks for its respective jobs 1404 in the job queue (as shown in FIG. 10). If jobs 1404 exist for the mobile device 102, the server 126 delivers and the mobile device 102 retrieves these jobs 1404 (as shown in FIGS. 2 and 9), and may execute these jobs 1404 according to defined logic. This approach allows jobs 1404 to be planned for a mobile device 102, even if the mobile device 102 is not able to receive the job command at the time that the job 1404 is scheduled with the server 126. The server 126 can maintain the job queue regardless of the current status of any of the associated mobile devices 102. For example, if a device 102 is stolen and powered off, a user can add a particular protective job(s) 1404 to the job queue for the stolen device 102, even while the device 102 is still powered off. When the stolen device 102 is powered back on and thereafter checks the job queue, the planned protective job(s) 1404 can be delivered to the stolen device 102 for execution, which, for example, may be immediately.

In addition to jobs 1404, the system allows users to create reusable triggers for a mobile device 102 which may encompass a predefined set of conditions and result in a predefined response (e.g., executing actions, delivering notifications, etc.). Unlike a job 1404, which is typically processed by a receiving client or device 102 only once, triggers may be long-lived and may be utilized until they are modified or removed by a user or system.

Figure 11:
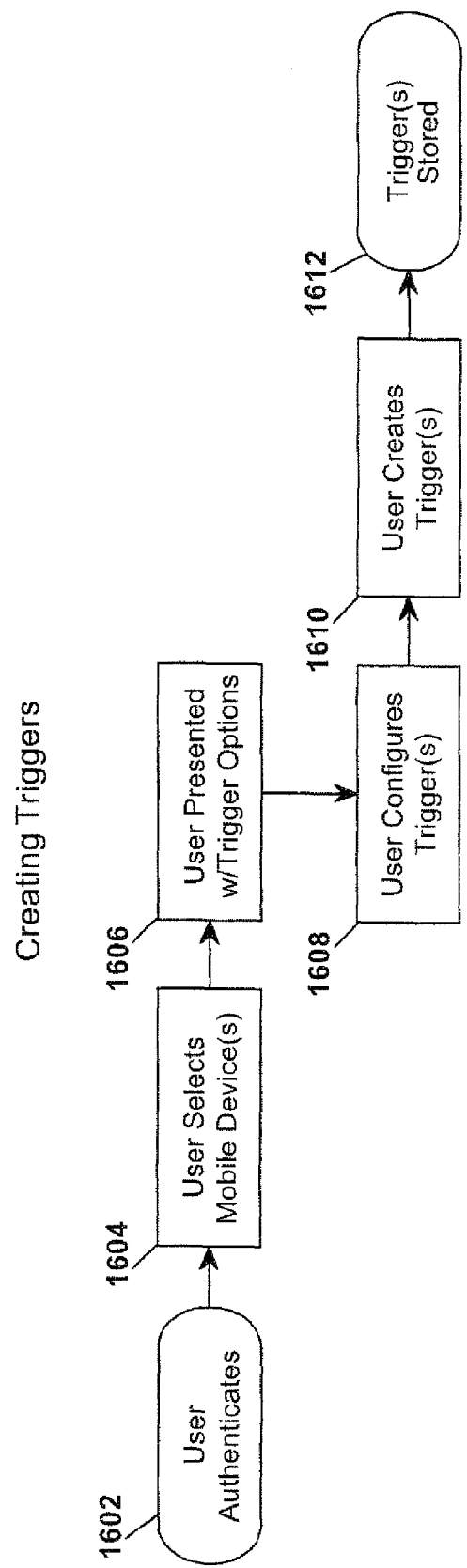
FIG. 11 is a flow chart of an exemplary method of creating and issuing triggers.

FIG. 11 is a flow chart of an exemplary method of creating and issuing triggers according to another embodiment of the present invention. The process starts with block 1602, where a user can be authenticated by the system. After the user is authenticated in block 1602, the logical flow proceeds to block 1604 where a mobile device(s) 102 that the user wishes to create triggers for may be selected. Once selected in block 1604, the user or system can be provided with options to create a desired trigger in block 1606. In block 1608, the user or system can configure the trigger(s), for example, by specifying the necessary preconditions and postconditions. In block 1610, the trigger can be created. Then in block 1612, the trigger can be stored on the server 126.

Figure 12:
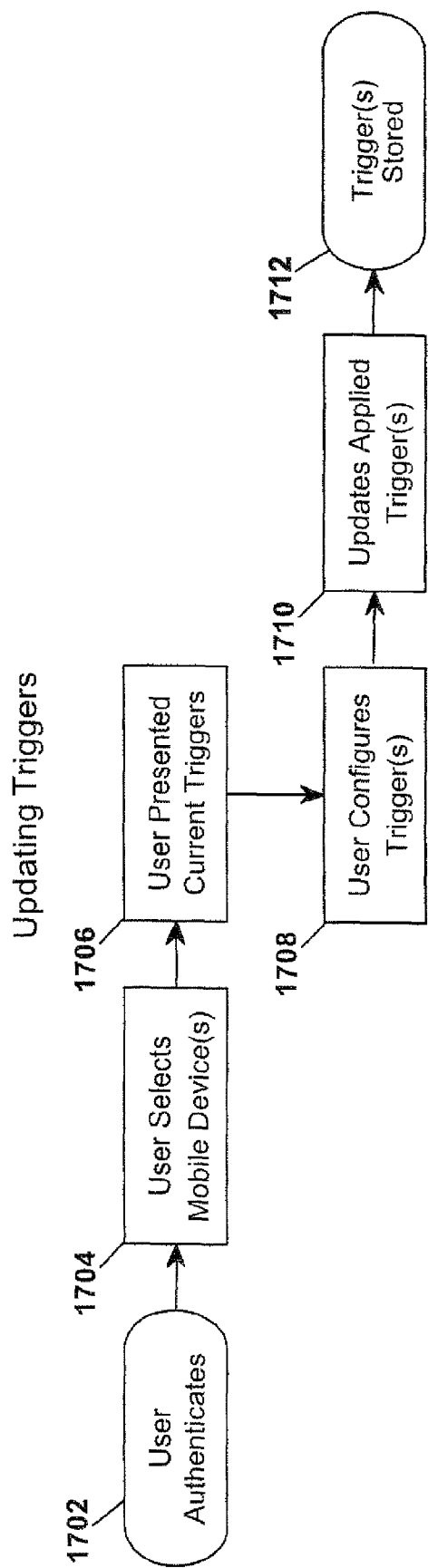
FIG. 12 is a flow chart of an exemplary method of updating triggers.

FIG. 12 is a flow chart of an exemplary method of modifying, updating, or deleting an existing trigger for a mobile device 102. The process can start with block 1702, where a user can be authenticated by the system. After the user is authenticated in block 1702, the logical flow can proceed to block 1704 where a mobile device(s) 102 that the user wishes to change triggers for may be selected. In block 1706, the user may view the device's current triggers and be presented with options to modify one or more triggers. The logical flow then proceeds to block 1708, where a user or system can configure or modify the trigger(s), using, for example, necessary preconditions and postconditions. In block 1710, the trigger updates can be applied. In block 1712, the trigger updates can be stored on the server 126.

Figure 13:
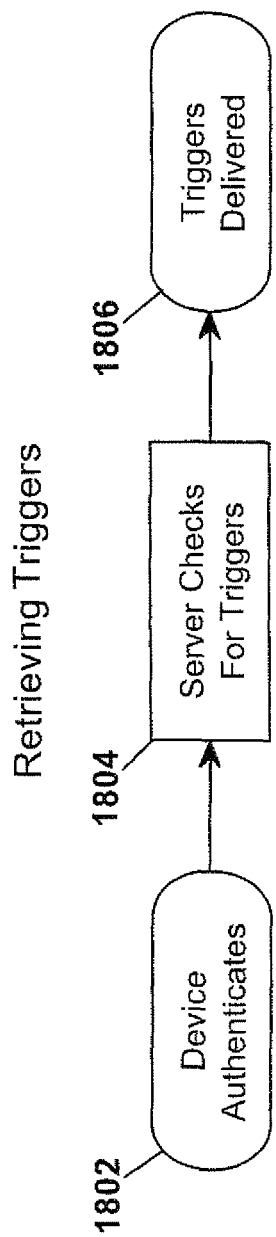
FIG. 13 is a flow chart of an exemplary trigger retrieval process.

FIG. 13 is a flow chart of an exemplary trigger retrieval process. The process can start with block 1802, where a device 102 can be authenticated by the system. For example, after a device has been authenticated in block 1802, the logical flow can proceed to block 1804, where the server 126 can deliver any applicable triggers according to defined logic in block 1804. For example, the server application 128 can deliver all active triggers for a particular device. The triggers may then be delivered to the mobile device 102 in block 1806.

To illustrate this process for several triggers, FIG. 14 illustrates an exemplary trigger datastore, illustrating how triggers may be stored. Individual triggers can be identified with a trigger_id 1902 and are associated with a specific device, which is identified with a device_id 1904. Each trigger includes a specific triggering event(s) 1906 based on a particular precondition, identified in data field 1908. The occurrence of the corresponding event can result in a postcondition response, such as the execution of a particular action, identified as 1910, and/or the delivery of a particular notification, identified as 1912. Unlike jobs, triggers may be long-lived, and while a state can be applied to a trigger (e.g., active, inactive, etc.), they are not required.

Figure 15:
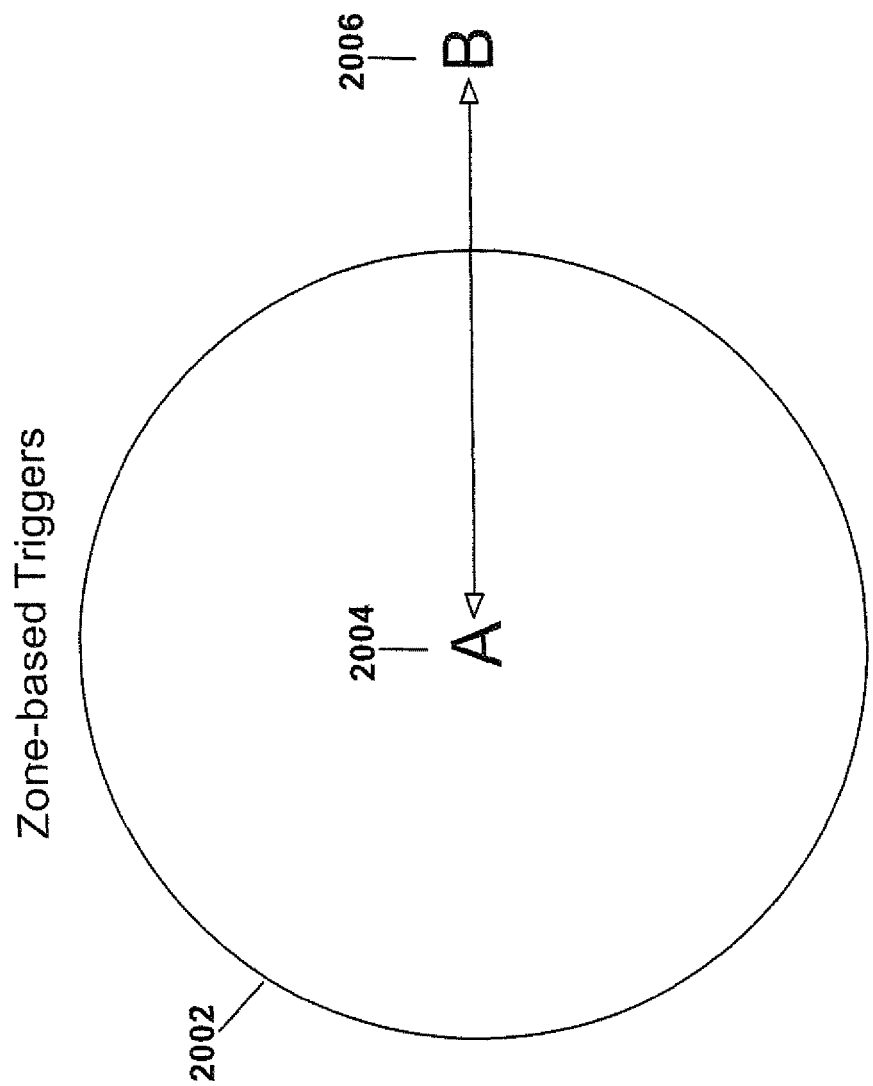
FIG. 15 is an illustration of an exemplary zone-based trigger.

FIG. 15 is an illustration of an exemplary zone-based trigger. Zones can be predefined areas or thresholds. The exemplary circle 2002 represents a physical area that can be used as a precondition to executing a trigger. For instance, the exemplary circle area 2002 may be defined by a 100 foot radius around a point A, which may be, for example, the center of a retail store location 2004. In this example, if an unauthorized user moves a mobile device 102 with this particular zone-based trigger active, to point B, identified as 2006, which is outside of the perimeter of area 2002, the mobile device 102 can execute (trigger) any number of assigned postcondition responses. These responses can be actions or jobs (e.g., 1910 of FIG. 14), such as tracking and locking the device 102 or delivering a notification to the retailer (e.g., 1912 of FIG. 14) based on its current position outside of zone 2002, point B 2006. Zonebased conditions are not restricted to location and can, for example, analyze connection and signal strengths for any variety of wireless protocols, such as Wi-Fi, Bluetooth, RFID, cell tower, and GPS. In addition, zone-based triggers are not limited to the device 102 being inside, such as 2004, or outside, such as 2006, of the predefinedzone, such as 2002. Varying degrees of input and placement can be used to determine the appropriate response. Zones may also be leveraged individually or in conjunction with other zones or parameters.

Figure 16:
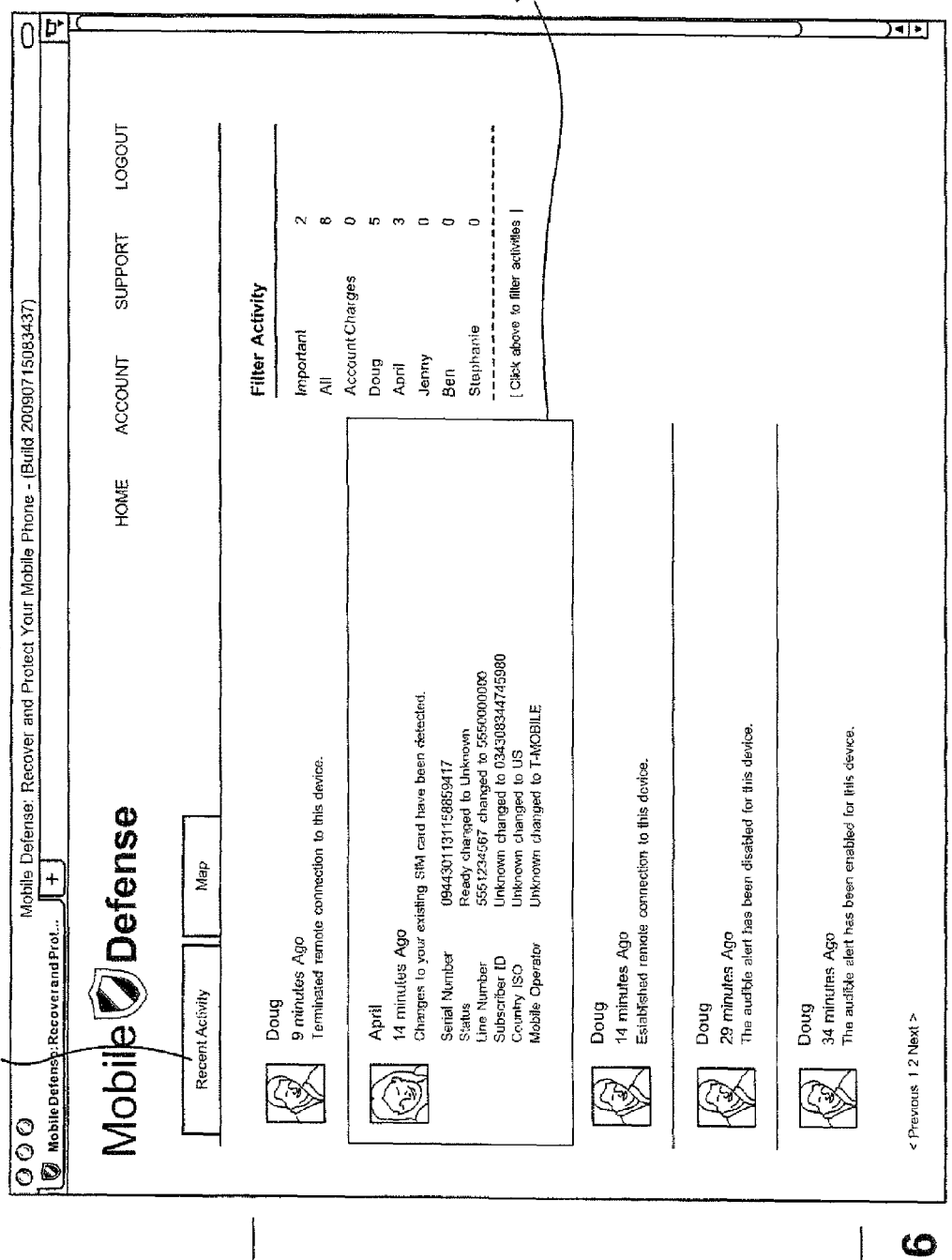
FIG. 16 is a sample screen shot of a user interface showing the activity feed for group of devices.

FIG. 16 is a sample screen shot of a user interface showing an activity feed for a group of devices 102. The status of jobs 1404 in the queue and triggers can be tracked throughout their lifecycles and monitored via the activity feed. An exemplary activity feed is shown as 1502 and can be thought of as, for example, an audit trail. This audit trail can be filtered and used to display aggregate information 1504 for multiple devices 102 or clients. The activity feed can be accessed, for example, via a website, RSS, or secure API. In addition to job status messages, the activity feed includes many other device specific notifications, such as SIM change alerts 1506, where the user may be provided with relevant information corresponding to the underlying event.

Figure 17:
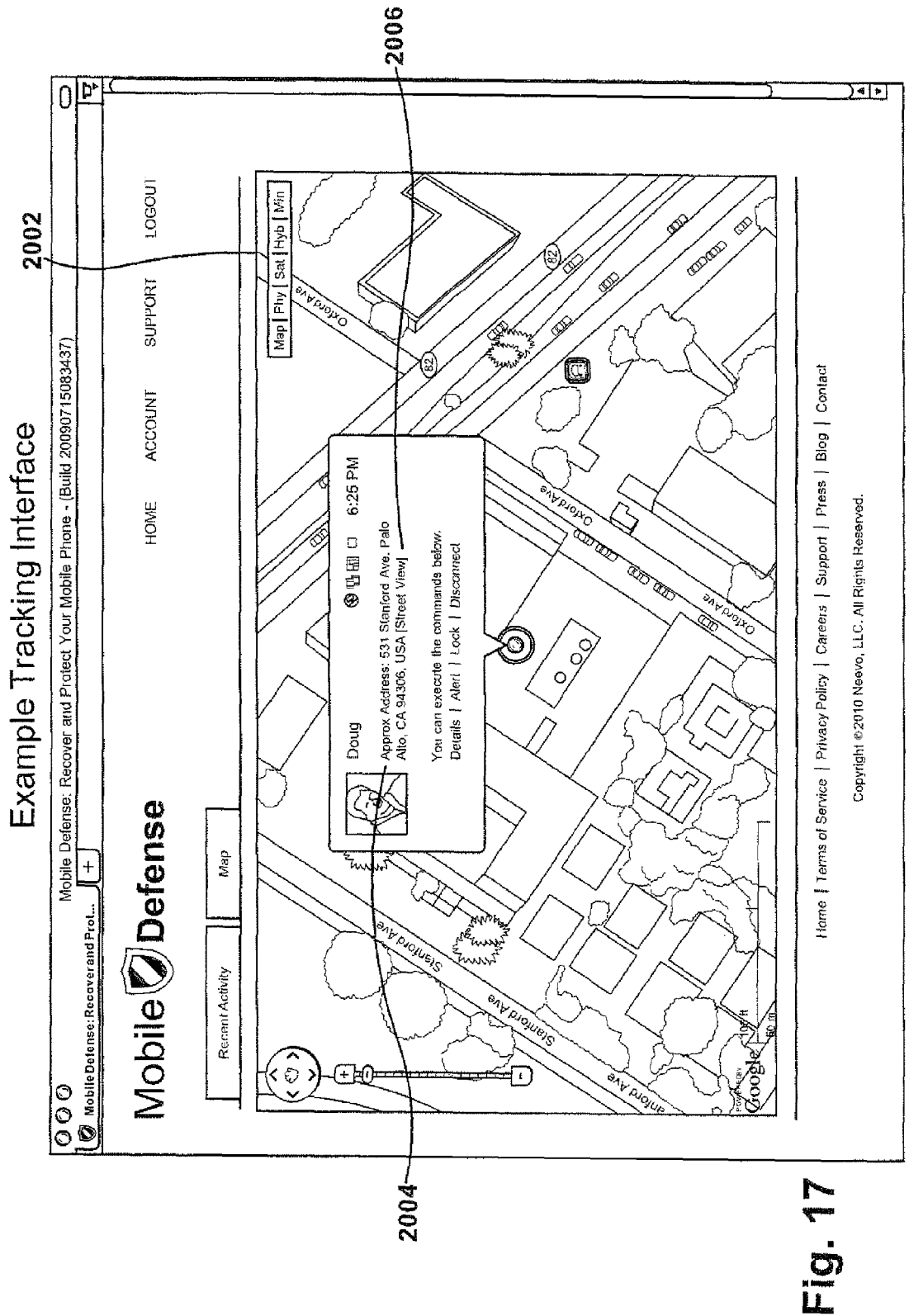
FIG. 17 is a sample screen shot of a user interface showing an exemplary tracking interface.
Figure 18:
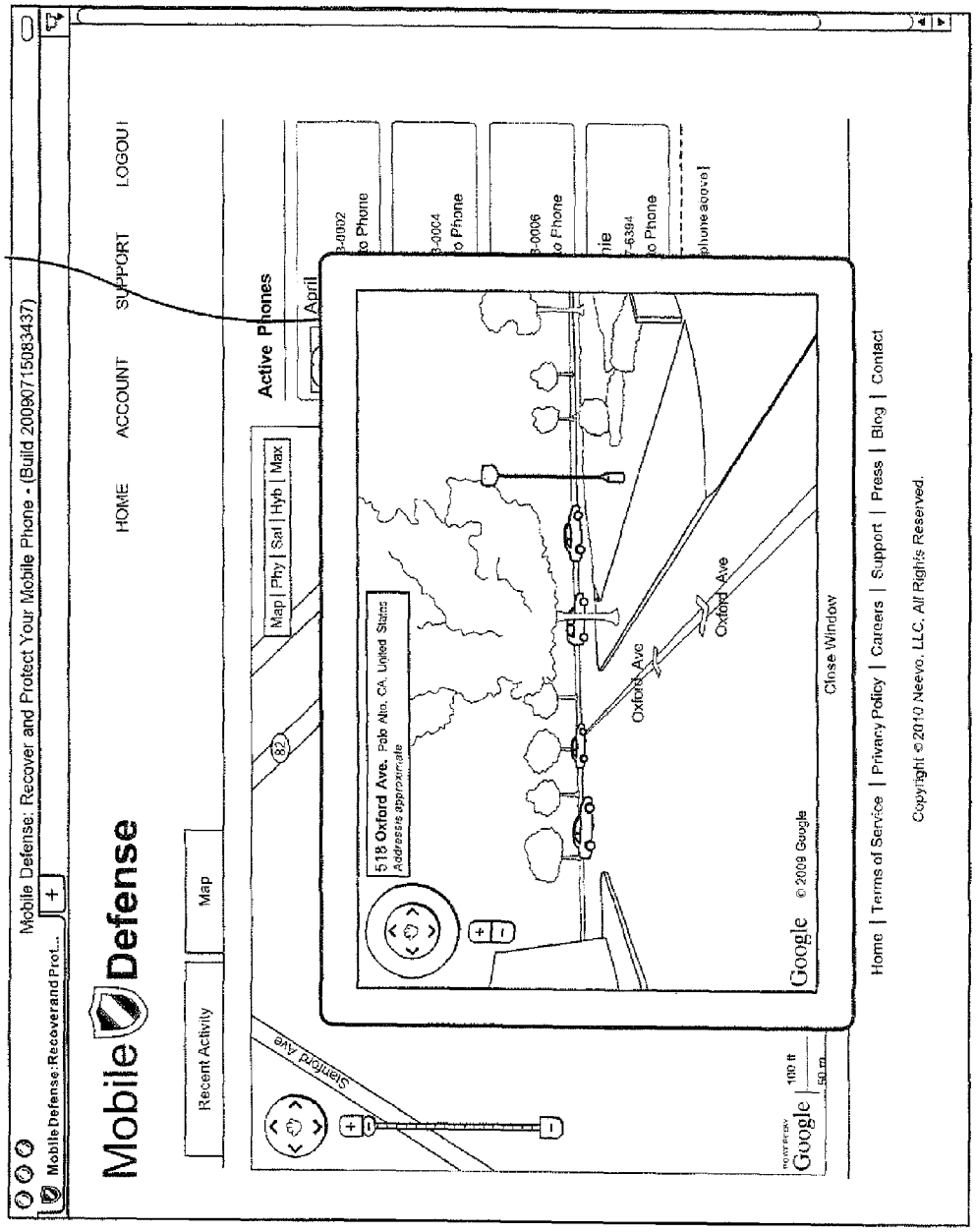
FIG. 18 is a sample screen shot of a user interface showing an exemplary street view interface.

FIG. 17 is a sample screen shot of a user interface showing the tracking of a mobile device. The interface uses data (e.g., latitude, longitude, altitude, etc.) returned from a job FIG. 10 or trigger FIG. 14 to display the near real-time location of one or many mobile devices 102 on an interactive map 2002. The embodiment utilizes external APIs (e.g., Google Maps) to provide additional semantic and location-based data that may assist in locating, managing, or protecting the mobile device (s) 102. For example, the Google Maps API may be used to perform reverse geocoding and display an approximate address 2004 for a mobile device 102. In addition, the Google Maps API may be used to display a 360° street level view 2006 of the surrounding location 2102 in FIG. 18 of a mobile device 102.

In many embodiments, an exemplary process or apparatus is described in terms of user activities, actions, or options. However, this is for convenience and the descriptions of these embodiments are not meant to limit the invention to these user based embodiments. A user may be a person, device, or system, such as a machine.

Embodiments of the invention may also include processes and apparatuses where the user-defined activities, actions, or options are accomplished automatically without user intervention or via pre-programmed techniques, such as, by the system. For example, the activities, actions, and options of the disclosed embodiments may be implemented via machine to machine communication.

In most embodiments, process flow charts depict the action blocks in series. However, this is for illustrative convenience and is not meant to limit the invention to only the depicted series combination. Other embodiments of the invention may include process steps in parallel or in a different series order, where applicable and effective. Also, the blocks of the process flow charts are used to illustrate the key steps of a process. In practice, a process flow may include many other steps not represented in the flow diagram.

While the invention is described herein in conjunction with one or more exemplary embodiments, it is evident that many alternatives, modifications, and variations can be apparent to those skilled in the art. Accordingly, exemplary embodiments in the preceding description are intended to be illustrative, rather than limiting, of the spirit and scope of the invention. More specifically, it is intended that the invention embrace all alternatives, modifications, and variations of the exemplary embodiments described herein that fall within the spirit and scope of the appended claims or the equivalents thereof.

Having described the invention, we claim:

1. A method for securing a mobile device comprising:
generating a time-sensitive server identity token (TSIT) at a server, the TSIT having an associated time stamp;
sending the TSIT to the mobile device;
generating a collection of time-based keys at the mobile device, each key representing a specific time within a period of time before the TSIT was received from the server;
verifying that the TSIT was provided by the server if the TSIT matches one of the collection of time-based keys
providing authentication information from the mobile device to the server in response to verification of the TSIT at the mobile device;
establishing a secure communications session between the mobile device and the server after authenticating the server to the mobile device; and subsequently
providing status information from the mobile device to the server;
providing a list of at least one security action from the server to the mobile device; and
processing the list of at least one security action at the mobile device such that each of the at least one security action is provided to one of a local queue for storage and a client software of the mobile device for execution.

2. The method of claim 1, the status information comprising a trigger update representing a local queue of active triggers at the mobile device.

3. The method of claim 1 further comprising updating a queue of security actions at the server in response to the status information provided from the mobile device to the server.

4. A system for securing at least one mobile device comprising:
a server comprising a controller and a non-transitory computer readable medium storing instructions executable by the controller, the executable instructions configured to perform a method comprising:
establishing a secure communications session with a user;
allowing the user to input a list of a plurality of security actions to be performed at a mobile device of the at least one mobile device associated with the user;
updating a list of security actions associated with the mobile device, comprising a plurality of security actions having associated conditions, according to the user input;
establishing a secure communications session with the mobile device after authenticating the server to the mobile device by verifying, at the mobile device, a time-sensitive server identity token (TSIT) provide by the server; and subsequently
providing the list of the plurality of security actions to the mobile device simultaneously as a single instruction set; and
updating the list of security actions according to a list of logged events and executed security actions since a last secure communications session with the mobile device.

5. The system of claim 4, wherein allowing the user to input the list of at least one security action to be performed at the mobile device associated with the user comprises allowing the user to input a trigger associated with one of the at least one security action, such that the security action is performed when the condition associated with the trigger is met.

6. The system of claim 4, wherein establishing the secure communications session with the user comprises:
generating a time-sensitive server identity token (TSIT) comprising an indication as to the time at which the TSIT was generated; and
sending the TSIT to the mobile device.

7. The system of claim 6, wherein generating the TSIT comprises:
randomly generating a client specific secret;
generating a time-based key;
forming a message from the client specific secret and the time-based key; and
hashing the message to form the TSIT.

8. The system of claim 6, wherein generating the TSIT comprises executing a secure hash algorithm with appropriate variables.

9. The system of claim 4 further comprising a mobile device comprising a controller and a non-transitory computer readable medium storing instructions executable by the controller, the executable instructions configured to perform a method comprising:
providing authentication information to the server;
providing status information to the server;
retrieving the list of at least one security action from the server; and
executing the list of at least one security action.

10. A system for securing at least one mobile device comprising:
a mobile device comprising a controller and a non-transitory computer readable medium storing instructions executable by the controller, the executable instructions configured to perform a method comprising:
providing authentication information from the mobile device to an associated sever in response to authenticating, at the mobile device, a time-sensitive server identity token (TSIT) provide by the sever; and subsequently
providing status information to the server, the status information comprising a trigger update representing a local queue of active triggers and a log of jobs executed and triggers whose conditions have been met since a last provision of status information to the server;
retrieving an update from the server representing a difference between the local queue and a job queue at the server; and
modifying the local queue according to the received update.

11. The system of claim 10, wherein providing authentication information to an associated server comprises:
determining that client data at the mobile device is incomplete;
utilizing a persistent Application Programming Interface (API) key to authenticate the mobile device at the server: and
synchronizing the client data at the mobile device with stored client data at the server.

12. The system of claim 10, wherein the update from the server comprises a job, and the method further comprises executing the job when it is received at the mobile device.

13. The system of claim 10, wherein one of the active triggers comprises a condition of multiple failed authentication attempts by a user of the mobile device.

14. The system of claim 10, wherein one of the active triggers comprises a condition of the passage of a predetermined period of time since a last communication with the server.

15. The system of claim 10, wherein one of the active triggers comprises a condition that the mobile device is outside of a predefined area.

16. The system of claim 10, the method further comprising:
receiving a time-sensitive server identity token (TSIT) from the server; and
verifying that the TSIT was provided by the server;
wherein providing authentication information to the associated server comprises providing authentication Information to the associated server only once the TSIT is verified to have been provided by the server.

17. The system of claim 10, wherein providing status information to the server comprises providing at least one of a battery status, device settings, installed applications, changes to the memory of the device, and performance information of the mobile device to the server.

18. The system of claim 10 further comprising a server comprising a controller and a non-transitory computer readable medium storing instructions executable by the controller, the executable instructions configured to perform a method comprising:
establishing a secure communications session with a user;
allowing a user to input at least one security action to be performed at the mobile device to provide the list of security actions;
establishing a secure communications session with the mobile device; and
providing the update to the mobile device, the update comprising the at least one security action.

19. The system of claim 10, wherein the local queue of active triggers comprises detection that the mobile device is in a location outside of a predetermined region.

20. A system for securing at least one mobile device comprising:
a mobile device comprising a controller and a non-transitory computer readable medium storing instructions executable by the controller, the executable instructions configured to perform a method comprising:
receiving a time-sensitive server identity token (TSIT) from the server;
generating a collection of time-based keys, each key representing a specific time within a period of time before the TSIT was received from the server;
verifying that the TSIT was provided by the server if the TSIT matches one of the collection of time-based keys;
providing authentication information to an associated server once the TSIT is verified to have been provided by the server and a secure communications session is established between the mobile device and the sever; and subsequently
providing status information to the server, the status information comprising a trigger update representing a local queue of active triggers;
retrieving an update from the server representing a difference between the local queue and a job queue at the server; and
modifying the local queue according to the received update.

* * * * *